(12) United States Patent
Masubuchi

(10) Patent No.: US 6,537,472 B2
(45) Date of Patent: Mar. 25, 2003

(54) PROCESS FOR PRODUCING A CUSHIONING ARTICLE

(75) Inventor: Tetsuo Masubuchi, Kanagawa (JP)

(73) Assignee: Asahi Kasei Kabushiki Kaisha, Osaka (JP)

(*) Notice: Subject to any disclaimer, the term of this patent is extended or adjusted under 35 U.S.C. 154(b) by 0 days.

(21) Appl. No.: 09/793,094

(22) Filed: Feb. 27, 2001

(65) Prior Publication Data

US 2001/0023510 A1 Sep. 27, 2001

(30) Foreign Application Priority Data

Feb. 29, 2000 (JP) ........................................ 2000-053225
Feb. 29, 2000 (JP) ........................................ 2000-053272

(51) Int. Cl.⁷ ............................................. B29C 44/06
(52) U.S. Cl. .................... 264/45.3; 264/51; 264/54; 264/300; 264/328.12
(58) Field of Search ...................... 264/51, 300, 54, 264/45.3, 328.12

(56) References Cited

U.S. PATENT DOCUMENTS 5,052,125 A * 10/1991 Jensen ........................... 34/23
5,096,652 A  3/1992 Uchiyama et al.
6,033,501 A * 3/2000 Yamaguchi et al. ......... 156/245

FOREIGN PATENT DOCUMENTS

| DE | 33 03 756 A1 | 8/1989 |
| DE | 689 13 773 T2 | 8/1989 |
| JP | 7-238461 A | 9/1995 |
| JP | 7-238462 A | 9/1995 |
| JP | 7-243163 A | 9/1995 |
| JP | 7-324271 A | 12/1995 |
| JP | 8-010470 A | 1/1996 |
| JP | 8-024068 A | 1/1996 |
| JP | 8-056772 A | 3/1996 |
| JP | 8-061410 A | 3/1996 |

* cited by examiner

Primary Examiner—Allan R. Kuhns
(74) Attorney, Agent, or Firm—Birch, Stewart, Kolasch & Birch, LLP

(57) ABSTRACT

A process for producing a cushioning article, which comprises: providing an injection molding apparatus having plural injection orifices, said orifices each having a discharge angle from 5° to 45° inclining from the vertical direction; injecting a thermoplastic polymer material in the form of strand from said plural orifices into a mold; and cooling said mold followed by demolding. The discharge angles of said orifices as projected into a horizontal plane each preferably has a phase difference of from 5° to 120° relative to those of adjacent orifices. Also disclosed is a cushioning article molded by the production process.

18 Claims, 3 Drawing Sheets

PROCESS FOR PRODUCING A CUSHIONING ARTICLE

FIELD OF THE INVENTION

This invention relates to cushioning articles which are suitable for seat pads in various vehicles and furniture such as sofas and beds, and to a process for producing the same.

DESCRIPTION OF THE RELATED ART

As cushioning articles to be used in furniture such as beds and vehicle seats, there are known integrally molded articles made of foamed RIM (Reaction Injection Molding) urethane, waddings of nonelastic crimped fibers such as polyester and fibrous cushioning articles formed by bonding nonelastic crimped fibers with binders. Among all, foamed RIM urethane is widely used in, for example, vehicle seats because of the high settling resistance and favorable processing characteristics thereof.

However, the foamed RIM urethane has a crosslinked structure, which brings about a problem that it is hardly recyclable. In the disposal of the foamed RIM urethane, moreover, there arises another problem to be solved that toxic cyanogen gas is generated in the combustion thereof. The foamed RIM urethane suffers from an additional problem that it has only an insufficient air-permeability and thus imparts a stuffy feel in prolonged use.

On the other hand, cushioning articles made of thermoplastic fibers are disclosed in, for example, JP-A-7-243163 (The term "JP-A" as used herein means an "unexamined published Japanese patent application"), JP-A-7-238461, JP-A-7-238462, JP-A-7-324271, JP-A-8-10470, JP-A-8-124068 and JP-A-8-56772. These cushioning articles are excellent in air-permeability owing to the three-dimensional network structure of the fibers. Because of being made of thermoplastic materials, these cushioning articles have another advantage of being recyclable. In the three-dimensional network structure of these cushioning articles, however, the fusion strength of the fibers is still insufficient and thus only poor settling resistance can be achieved when processed into cushions. In addition, there arises another problem that uniform cushioning articles can be hardly obtained because of the insufficient steric regularity thereof. Furthermore, these cushioning articles are less uniform, which makes them inferior in comfortableness in sitting on to the existing foamed and crosslinked urethane.

JP-A-8-61410 discloses a process of using thermoplastic fibers and foaming the same. In this process for producing the foamed fibers, unfoamed fibers are extruded into a mold and then foaming is carried out in another step. As a result, not only troublesome procedures but much energy are needed for the latter step of heating. Similar to the non-foamed fiber cushioning articles as described above, the foamed fibers thus obtained have insufficient fusion strength and thus only poor settling resistance can be achieved when processed into cushions. In addition, there arises another problem that uniform cushioning articles can be hardly obtained because of the insufficient steric regularity thereof. Since the foaming is performed in the latter step, moreover, the voids among fibers have only a small volume and thus the apparent density of the cushioning articles is enlarged, which results in another problem that the cushioning articles are poor in softness.

SUMMARY OF THE INVENTION

An object of the invention is to provide a process for producing a cushioning article which has good air-permeability, excellent settling resistance and favorable softness.

Another object of the present invention is to provide a cushioning article molded by the production process.

Other objects and effects of the present invention will become apparent from the following description.

The above-described objects of the present invention have been achieved by providing the following production processes and cushioning article.

(1) A process for producing a cushioning article, which comprises:

providing an injection molding apparatus having plural injection orifices, said orifices each having a discharge angle from 5° to 45° inclining from the vertical direction;

injecting a thermoplastic polymer material in the form of strand from said plural orifices into a mold; and cooling said mold followed by demolding.

(2) The production process according to item (1) above, wherein the discharge angles of said orifices as projected into a horizontal plane each has a phase difference of from 5° to 120° relative to those of adjacent orifices.

(3) The production process according to item (1) or (2) above, wherein said thermoplastic polymer material contains a foaming agent.

(4) The production process according to any one of items (1) to (3) above, wherein said thermoplastic polymer material comprises a thermoplastic elastomer.

(5) The production process according to item (4) above, wherein said thermoplastic elastomer is a polyester-based elastomer or a polyurethaner-based elastomer.

(6) A cushioning article molded by a production process according to any one of items (3) to (5) above, having an expansion ratio of from 1.0 to 4.0, a strand sectional area of from 0.2 to 25.0 mm$^2$ and an apparent density of the cushioning article of from 0.005 to 0.24 g/cm$^3$.

Figure 1:
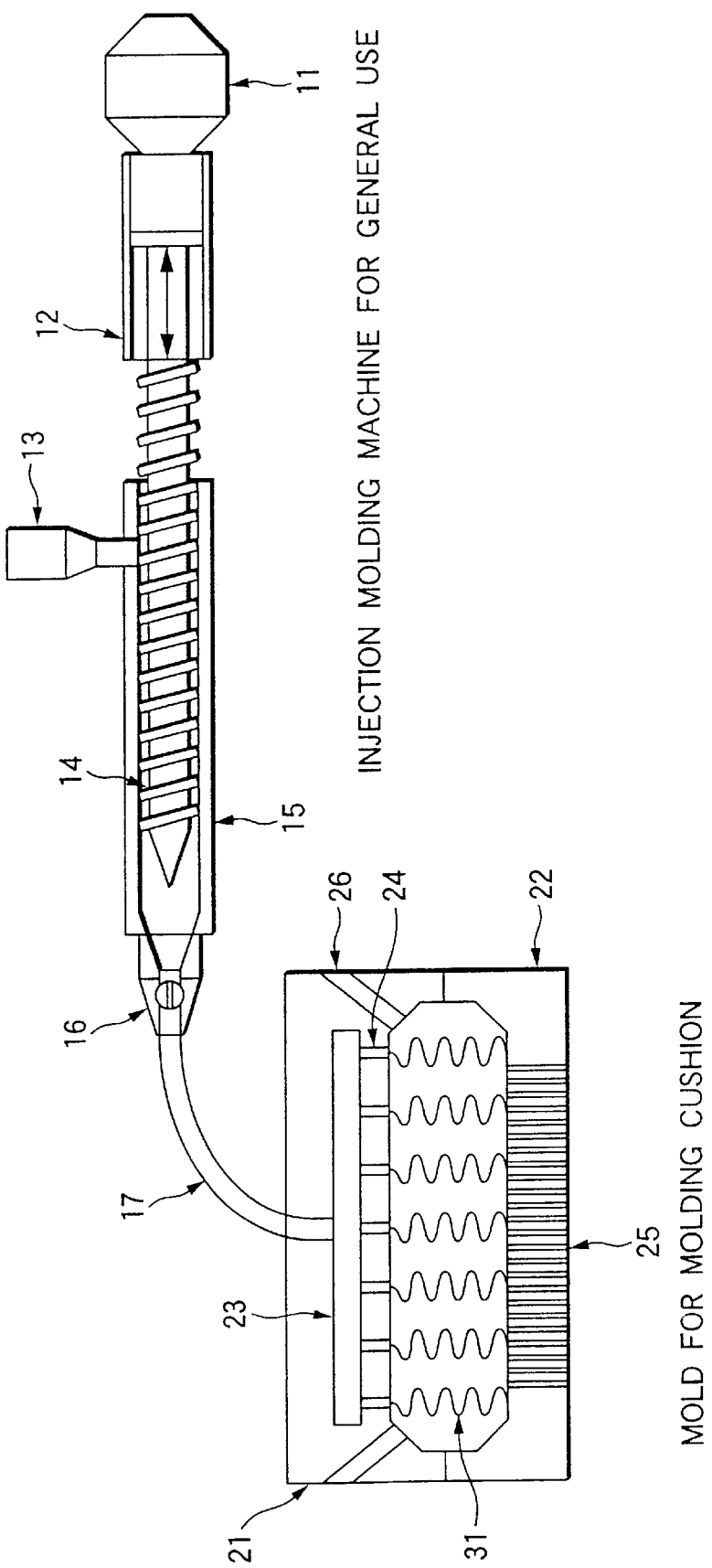
FIG. 1 is a schematic view of an apparatus for molding a cushioning article.

In these figures, the numerical symbols have the following meanings:

11: motor for driving screw
12: injection cylinder
13: hopper
14: screw
15: heating column
16: pressure valve (shut-off nozzle)
17: flexible hose
21: fixed mold
22: mobile mold
23: manifold
24: orifice (hot runner type)
25: inlet of cooling water
26: outlet of cooling water
31: foamed strand.

DETAILED DESCRIPTION OF THE INVENTION

In the process of producing a cushioning article according to the invention, use can be made of publicly known thermoplastic polymer materials. Particular examples thereof include olefin resins such as polyethylene, polypropylene, polybutene, ethylene-vinyl acetate copolymer, poly(4-methylpentene-1) and cycloolefin resins, styrene resins such as polystyrene, AS (acrylonitrile-styrene copolymer) resins and ABS (acrylonitrile-butadiene-styrene copolymer) resins, polyamide resins, polyester resins, modified polyphenylene ether resins, polyacetal resins, polycarbonate resins, polysulfone resins, and various thermoplastic elastomers. Among these thermoplastic polymer materials, it is preferable to use thermoplastic elastomers, since cushioning articles obtained therefrom are excellent in softness.

Examples of the thermoplastic elastomers (hereinafter referred to simply as TPE) include olefin-based TPE, styrene-based TPE, polyester-based TPE, polyurethaner-based TPE, polyvinyl chloride-based TPE and polyamide-based TPE.

Examples of the olefin-based TPE include blends obtained by merely mixing olefin resins (for example, polypropylene, polyethylene) with ethylene/propylene rubber (EPR), ethylene/butene rubber (EBR), olefin rubber such as ethylene/octene TPE or TPE, and dynamically vulcanized TPE. Particular examples thereof include "Thermorun" manufactured by Mitsubishi Chemical Corporation, "Milastomer" manufactured by Mitsui Petroleum Chemical Industries, Ltd., "Sumitomo TPE" manufactured by Sumitomo Chemical Co., Ltd., "Santoprene" manufactured by AES Japan, Ltd., "Asahi Kasei TPV" manufactured by Asahi Chemical Industry Co., Ltd., and "Catalloy" manufactured by Montell SDK Sunrise.

It is also possible to use olefin-based TPE produced by using metallocene catalysts such as ethylene-propylene-based TPE, ethylene-butene-based TPE and ethylene-octene-based TPE. Particular examples thereof include "Tafmer" manufactured by Mitsui Petroleum Chemical Industries, Ltd. and "Engage" manufactured by DuPont-Dow Elastomers.

Examples of the styrene-based TPE include elastomers containing as the component styrene-butadiene copolymer, styrene-isoprene copolymer or hydrogenated derivatives thereof. Particular examples thereof include "Rabalon" manufactured by Mitsubishi Chemical Corporation, "Sumitomo TPE-SB" manufactured by Sumitomo Chemical Co., Ltd., "Elastomer AR" manufactured by Aron Chemical, "Tufprene" and "Tuftec" manufactured by Asahi Chemical Industry Co., Ltd.

As the polyester-based TPE, use can be made of either a polyester—polyester-based TPE consisting of a polyester (for example, polybutylene terephthalate) as the hard segment and a polyether (for example, polytetramethylene glycol ether (PTMG), PTMEGT (PTMG/terephthalic acid condensation product)) as the soft segment or polyester—polyester-based TPE consisting of such a polyester as described above as the hard segment and an aliphatic polyester (for example, polycaprolactone) as the soft segment. It is particularly favorable to use a polyester—polyester-based TPE to obtain a preferable softness. Particular examples thereof include "Pelprene" manufactured by Toyobo Co., Ltd. and "Hytrel" manufactured by DuPont-Toray.

The polyurethane-based TPEs are classified depending on the linear polyols employed and use can be made of either caprolactone type, adipate type, polycarbonate type or polyether type. Among all, it is preferable to use caprolactone-type TPE having high mechanical strength and well-balanced thermal aging resistance and low temperature resistance. More particularly, it is possible to use therefor, for example, "Pandex" manufactured by Dainippon Ink and Chemicals, Inc., "Elastoran" manufactured by Nippon Elastoran or "Resamine P" manufactured by Dainichiseika Color & Chemicals Mfg. Co., Ltd.

Examples of the vinyl chloride-based TPE include those prepared by adding a plasticizer to a vinyl chloride polymer having a high degree of polymerization and those further containing a rubbery component such as nitrile rubber or acryl rubber. Particular examples thereof include "Sumiflex" manufactured by Sumitomo Bakelite Co., Ltd. and "Sunprene" manufactured by Mitsubishi Chemical Corporation.

Among these TPEs, polyester-based TPE and polyether-based TPE are particularly preferable, since they are excellent in heat resistance and settling resistance when processed into cushioning articles.

The thermoplastic polymer material to be used in the invention has a melt flow rate (determined at 230° C. under a load of 2.16 kg, hereinafter referred to simply as MFR) of from 0.5 to 100 g/10 min, preferably from 5 to 50 g/10 min and still preferably from 10 to 30 g/10 min. It is undesirable to use a thermoplastic polymer material having an MFR less than 0.5 g/10 min, since such a material is poor in the extrusion molding characteristics and thus suffers from melt fracture. It is also undesirable to use a thermoplastic polymer material having an MFR exceeding 100 g/10 min, since such a material is poor in mechanical characteristics such as strength and cannot maintain a foaming gas in case of being foamed, thereby showing poor foaming characteristics.

In case where a thermoplastic elastomer is used, it is preferable that such a TPE has a Shore D hardness (ASTM D785) of from 20 to 70, still preferably form 30 to 50. It is undesirable that to use a TPE having a Shore D hardness less than 20, since such a TPE shows worsened heat resistance and settling resistance when processed into a cushioning article. It is also undesirable to use a TPE having a Shore D hardness exceeding 70, since a cushioning article obtained therefrom has only an insufficient softness.

These thermoplastic polymer materials may further contain plasticizers, if necessary. Examples of the plasticizers include phthalic acid esters such as dioctyl phthalate, dibutyl phthalate, diethyl phthalate, butylbenzyl phthalate, di-2-ethylhexyl phthalate, diisodecyl phthalate, diundecyl phthalate and diisononyl phthalate; phosphoric acid esters such as tricresyl phosphate, triethyl phosphate, tributyl phosphate, tri-2-ethylhexyl phosphate, trimethylhexyl phosphate, tris-chloroethyl phosphate and tris-dichloropropyl phosphate; fatty acid esters such as trimellitic acid esters (for example, octyl tirmellitate, isodecyl trimellitate), dipentaerythritol esters, dioctyl adipate, dimethyl adipate, di-2-ethylhexyl azelate, dioctyl azelate, dioctyl sebacate, di-2-ethylhexyl sebacate and methylacetyl ricinoleate; pyromellitic acid esters such as octyl pyromellitate; epoxy-based plasticizers such as epoxidized soybean oil, epoxidized linseed oil and epoxidized fatty acid alkyl esters; polyether-based plasticizers such as adipic acid ether esters and polyethers; liquid rubbers such as liquid NBR, liquid acrylic rubber and liquid polybutadiene; and nonaromatic mineral oils. Either one of these plasticizers or a combination of two or more of the same may be used.

Furthermore, the thermoplastic polymer materials may further contain publicly known additives so long as the properties thereof are not worsened. Examples of these additives include fillers and reinforcing agents such as kaolin, silica, mica, titanium dioxide, alumina, calcium carbonate, calcium silicate, clay, kaolin, diatomaceous earth, asbestos, barium sulfate, aluminum sulfate, calcium sulfate, basic magnesium carbonate, molybdenum disulfide, graphite, glass fiber and carbon fiber; inorganic flame retardants such as antimony trioxide, antimony pentaoxide, sodium antimonate, magnesium hydroxide and zinc borate, phosphorus-based flame retardants such as guanidine phosphate, tris(chloroethyl) phosphate, tris (monochloropropyl) phosphate, tris(dichloropropyl) phosphate, tris(tribromophenyl) phosphate and red phosphorus, halogen-containing flame retardants such as paraffin chloride, polyethylene chloride, hexabromobenzene and decabromodipheynyl oxide; lubricants or mold-releasing agents such as zinc stearate and bisamide stearate; colorants and pigments for coloring such as carbon black, ultramarine, titanium white, zinc white, red iron oxide, Prussian blue, azo pigments, nitro pigments, lake pigments and phthalocyanine pigments; flame-proofing agents such as octabromodiphenyl and tetrabromobisphenol polycarbonate; thickeners such as epoxy compounds and isocyanate compounds; silicone oil and silicone resins.

In case where heat resistance and light resistance are needed, it is desirable to add stabilizers such as heat stabilizers and light stabilizers. As the heat stabilizers, use can be made of phosphorus compounds such as aliphatic, aromatic or alkylated aromatic esters of phosphoric acid and phosphorous acid, hypophosphorous acid derivatives, phenylphosphonic acid, phenylphosphic acid, diphenylphosphonic acid, polyphosphonate, dialkylpentaerythritol diphosphite and dialkylbisphenol A diphosphate; sulfur-containing compounds such as phenol derivatives, in particular, hindered phenol compounds, thioether compounds, dithionic acid compounds, mercaptobenzimidazole compounds, thiocarbanilide compounds and thiodipropionic acid esters; and tin compounds such as tin maleate and dibutyltin monoxide. Either one of these stabilizers or a combination of two or more of the same may be used.

Examples of the light stabilizers include benzotriazole compounds and benzophenone compounds. It is also adequate to use radical-capturing type light stabilizers such as hindered amine compounds.

It is preferable that these stabilizers are added in an amount of from 0.01 to 2 parts by weight per 100 parts by weight of the thermoplastic polymer material.

As the foaming agent to be used in a case of foaming the thermoplastic polymer material in the process for producing a cushioning article according to the invention, either an organic foaming agent or an inorganic one may be used, so long as it is usable in foam molding the thermoplastic polymer material by the conventional injection molding method. Particular examples of such a foaming agent include azo compounds such as azodicarboxylic acid, nitroso compounds such as N,N'-dinitrosopentamethylenetetramine, carbonates such as sodium bicarbonate and ammonium bicarbonate, organic acids such as citric acid, sodium citrate and oxalic acid and sodium boron hydride. It is also possible to combine a carbonate with an organic acid. In case where the foam molding is performed at a relatively high temperature, use may be made of, for example, p,p'-oxybisbenzenesulfonyl semicarbazide, p-toluenesulfonyl semicarbazide, trihydrazinotriazine or barium azodicarboxylate. However, it is generally favorable to use azodicarboxylic acid amide. The foaming agent may be added in the step of kneading the materials. Alternatively, the foaming agent or its master batch (the thermoplastic polymer material containing the foaming agent) may be added in the step of molding.

The content of the foaming agent ranges from 0.01 to 10 parts by weight, preferably from 1 to 9 parts by weight and still preferably from 2 to 7 parts by weight. When the content of the foaming agent is less than the lower limit as specified above, only a poor expansion ratio can be achieved. On the other hand, it is undesirable that the content thereof exceeds the upper limit as specified above, since the strength of the foamed strands is lowered in this case.

Next, the process for producing a cushioning article according to the invention will be illustrated by reference to the FIGS. 1 to 3. The process for producing a cushioning article according to the invention involves the step of: providing an injection molding apparatus provided with plural injection orifices; injecting, as strands, a thermoplastic polymer material from these plural orifices, having discharge angles from 5° to 45° inclining from the vertical direction, into a mold; and cooling the mold followed by demolding.

The injection molding machine as used herein is exemplified by an extruder to be used as a heating column in an injection molding machine (which is an extruder wherein a plasticization metering operation can be switched into a discharge operation and vice versa) as shown in FIG. 1. It is preferable to use an extruder of the heating column type of an injection molding machine whereby the plasticization metering and the discharge can be quantitatively performed. Thus, the thermoplastic polymer material is once pooled in a heating column 15 at a temperature higher than the melting point of the thermoplastic polymer material and then injected as strands from plural orifices 24 into a mold. In case of foaming the strands, use is made of an injection molding apparatus provided with a nozzle having a pressure valve, whereby the injection can be carried out under a pressure at a definite level or above, or a shut-off nozzle 16, whereby the valve can be opened exclusively at the injection, so as to regulate the foaming in the heating column. Heating in the heating column 15 is appropriately adjusted so that the thermoplastic polymer material foams upon being discharged from the orifices.

In the cushioning article according to the invention, a continuous three-dimensional network structure is formed by feeding the thermoplastic polymer material (i.e., the feedstock material) directly into the mold. Thus, a cushioning article in the steric shape along the inner face of the mold can be efficiently and precisely formed. When a large stress is applied to the cushioning article in using, the whole steric network structure is three-dimensionally deformed and absorbs the stress, since a steric three-dimensional network structure is formed via the fusion of strands being in contact with each other in this three-dimensional network structure. When the stress is relieved, then the steric network structure can be restored into the original shape.

Figure 2:
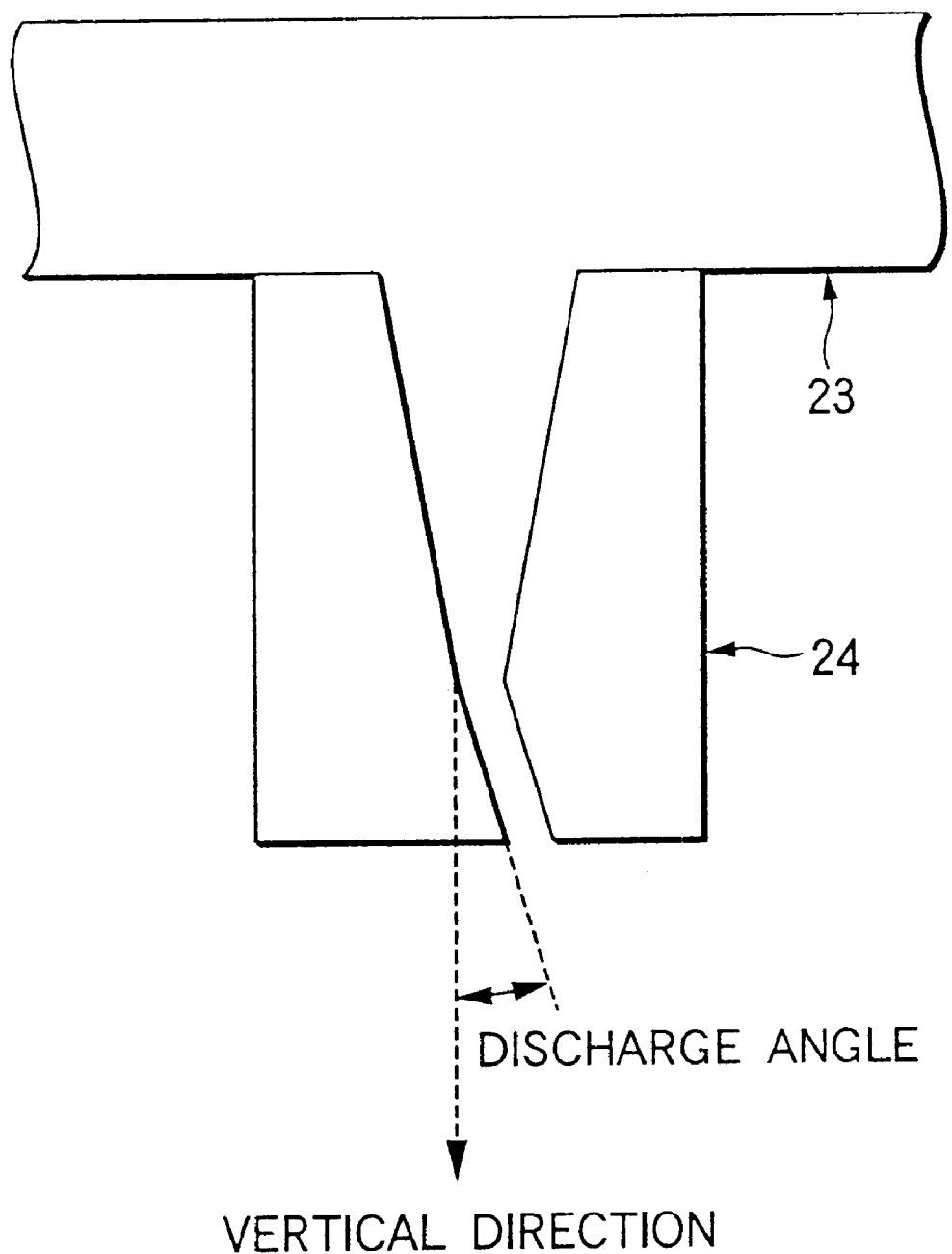
FIG. 2 is an enlarged view of orifice 24 in FIG. 1.

FIG. 2 is an enlarged view of the orifice 24 in FIG. 1. To elevate the fusion strength among strands, it is important that the discharge angle of the orifice, depending on which the discharge direction of the strand is determined, inclines from 5° to 45°, preferably from 10° to 35°, from the vertical direction, as shown in FIG. 2. Owing to the oblique strand-injection direction, the injected strands strongly collide with each other, thereby achieving high fusion strength. In case where the injection angle is smaller than 5°, neither sufficient fusion strength nor favorable three dimensional network structure can be obtained. It is undesirable that the injection angle exceeds 45°, since strands are fused together around the orifices and thus network structures are localized in this case, which makes it impossible to give a uniform cushioning article.

Figure 3:
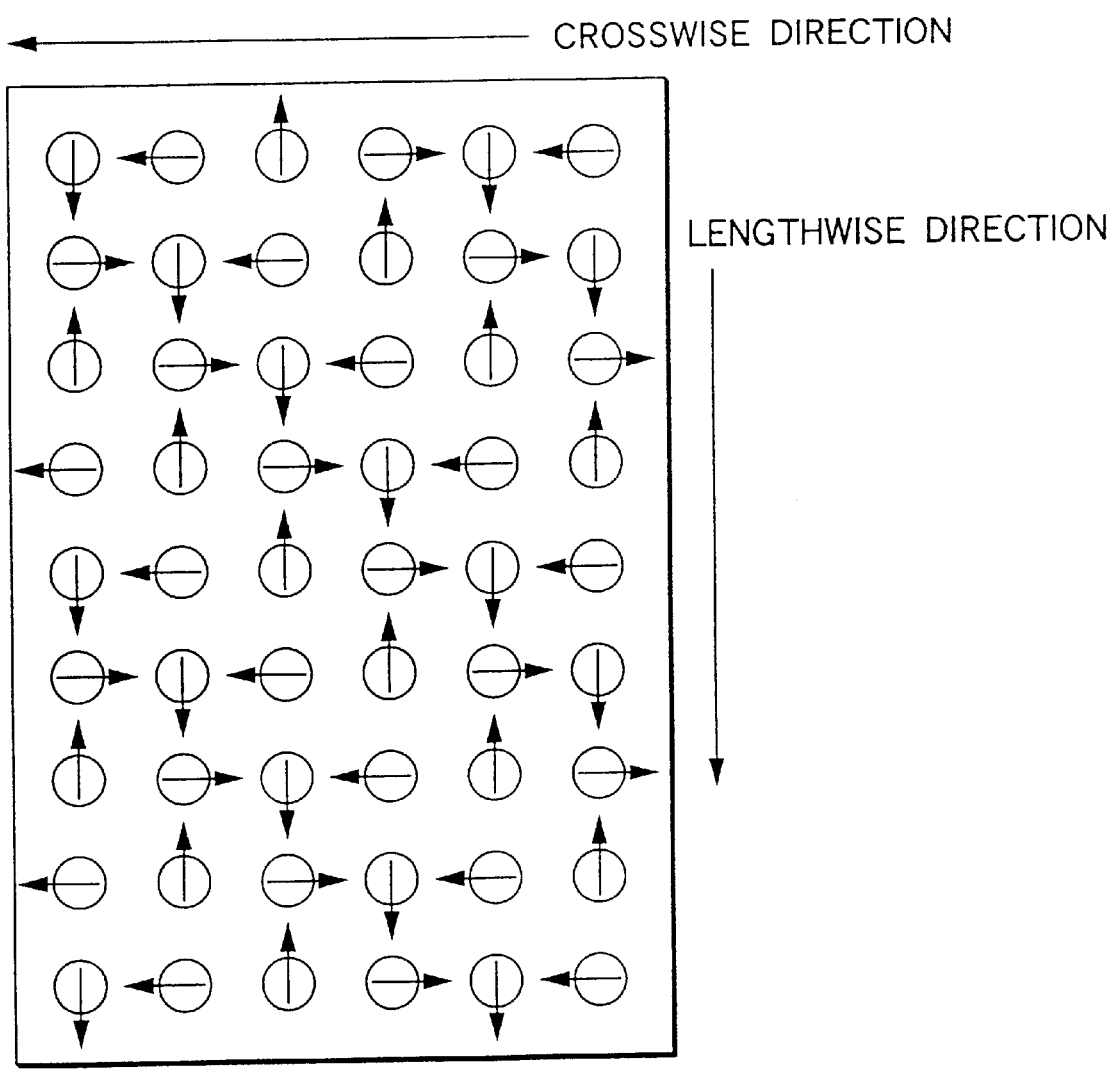
FIG. 3 is a model view showing the strand-injection direction of each orifice observed downward from the upper part of the mold.

FIG. 3 is a model view showing the injection direction of the strand from each orifice observed downward from the upper part of the mold. In the case of FIG. 3, the injection directions of the strands are arranged at phase differences of about 90° counterclockwise in the lengthwise direction (downward in FIG. 3). Also, the injection directions of the strands are arranged at phase differences of about 90° clockwise in the crosswise direction (from right to left in FIG. 3). By providing phase differences among the injection directions of the strands, the fusion strength among the strands can be enhanced and the bulk density of the three-dimensional network structure can be lowered. As a result, a soft and lightweight cushioning article can be obtained. It is particularly preferable that the orifices are located in such a manner as to give a constant phase difference among the injection directions as in FIG. 3, since a more uniform cushioning article can be thus obtained.

As the cushioning article obtained by the process according to the invention, a cushioning article formed by foaming a thermoplastic polymer material is favorable. In this case, it is preferable that the foamed strands have a sectional area of from 0.2 to 25.0 mm$^2$, preferably from 0.8 to 13.0 mm$^2$ so as to give a favorable rebound force. It is undesirable that the sectional area of the foamed strands is less than 0.2 mm$^2$, since the strength of the foamed fibers is worsened and thus the rebound force is lowered in this case. It is also undesirable that the sectional area exceeds 25.0 mm$^2$, since the number of the constituting strands per unit area of the cushioning article is decreased and thus the compression characteristics are worsened in this case. It is still preferable that the diameter of the foamed strands is from 1.8 to 5.0 mm. The shape of the section is not restricted. Namely, a circular, square or modified cross-section may be appropriately used depending on the purpose.

The apparent density of the cushioning article of the invention ranges from 0.005 to 0.24 g/cm$^3$, still preferably from 0.02 to 0.15 g/cm$^3$, still preferably form 0.04 to 0.10 g/cm$^3$. It is undesirable that the apparent density of the cushioning article is less than 0.005 g/cm$^3$, since the rebound force is lost in this case. Also, it is undesirable that the apparent density of the cushioning article exceeds 0.24 g/cm$^3$, since the comfortableness in sitting on the cushioning article is worsened in this case due to the excessively high repellency.

The expansion ratio of the cushioning article of the present invention is preferably from 1.0 to 4.0.

EXAMPLES

The present invention will be illustrated in greater detail with reference to the following Examples, but the present invention should not be construed as being limited thereto. The materials, molding machine, mold, foaming method and evaluation methods employed in the Examples and Comparative Examples are as follows.

1. TPE Components
(1) TPE Component-1:
   Polyester-based TPE (polyether-polyester type), Pelprene P-40H manufactured by Toyobo Co., Ltd. (Shore D hardness: 37, MFR: 23.0).
(2) TPE Component-2:
   Polyester-based TPE (polyester—polyester type), Pelprene S-1001 manufactured by Toyobo Co., Ltd. (Shore D hardness: 48, MFR: 29.0).
(3) TPE Component-3:
   Polyurethane-based TPE (caprolactone type), Pandex T2185 manufactured by Dainippon Ink and Chemicals, Inc. (Shore D hardness: 40, MFR: 18.5).
(4) TPE Component-4:
   Olefin-based TPE Sumitomo TPE3255 manufactured by Sumitomo Chemical Co., Ltd. (Shore D hardness: 48, MFR: 12.0).
(5) TPE Component-5:
   Hydrogenated styrene-based TPE: Tuftec E2094 manufactured by Asahi Chemical Industry Co., Ltd. (Shore D hardness: 47, MFR: 4.0).

2. Molding Machine (Vertical Injection Molding Machine for Common Resins):
   Injection volume: 400 cm$^3$.
   Mold clamping force: 250 tonf.
   Nozzle: provided with valve nozzle. (Nozzle having a pressure valve whereby injection can be carried out under a pressure at a definite level or above. Foaming in the cylinder can be regulated.)

3. Mold:
   Box shape (top face: 100×100 mm, depth: 70 mm). After plasticization metering with the injection molding machine, the thermoplastic polymer material is fed into orifices (sectional area: circular shape of 1.8 mm$^3$ in area) uniformly distributed on the top face of the mold. Then the molten thermoplastic polymer material can be linearly and continuously supplied in definite portions by free-falling into the mold. Hot runner type orifices, which can be heated at in injection step and cooled in the step of cooling the mold, are employed. These orifices are uniformly located on the top face of the mold at intervals of 10 mm both in the lengthwise and crosswise directions. As FIG. 2 shows, each orifice has a definite angle to the vertical direction so that the strand can be injected obliquely. As FIG. 3 shows, a phase difference is provided between orifices adjacent to each other.

After cooling for 1 minute, the contents of the mold are demolded to give a cushioning article of a desired steric shape. (In the cooling step, cold water is fed into the mold to thereby shorten the cooling time. To feed the cold water, the mold is provided with plural holes.)
4. Evaluation Method
(1) Measurement of Expansion Ratio Sample pieces (about 2 cm³) were cut out from 4 corners and the center of a sample. Then the expansion ratios were measured by using an electronic hydrometer manufactured by Mirage Boeki and the average was calculated.

(2) Fusion Conditions

Strands of a sample were pulled by hand. A sample suffering neither breakage at the fusion points nor separation was evaluated as "good", while one suffering from separation was evaluated as "poor".

(3) Apparent Density of Cushioning Article

A sample piece (5×cm×5 cm×3 cm) was cut out and weighed with a precise balance. Then the weight was divided with the volume.

(4) Settling Resistance

A sample piece (100×100×70 mm) was compressed at a ratio of 25% in the thickness direction (initial value t0: 70 mm) and fixed (thickness after compression t1: about 52.5 mm). Then it was allowed to stand in an oven at 70° C. for 24 hours. After taking out from the oven and cooled, the compression was relieved and the thickness t2 was measured after 30 minutes. The settling resistance was determined in accordance with the following formula.

Settling resistance=(t0−t2)/(t0−t1)×100.

(5) Comfortableness in Sitting On

Seats were prepared by using cushioning articles produced by the process of the invention. Panelists sat on these seats and evaluated as follows (n=10).

a) Touch to Floor

The touch to the floor in sitting on with a thud was sensorily evaluated as follows: ○: scarcely noticeable; Δ: somewhat noticeable; X: noticeable.

b) Stuffiness

While sitting on for 2 hours, the stuffy feel in the hip and inner thighs being in contact with the seat was sensorily evaluated as follows: ○: scarcely noticeable; Δ: somewhat noticeable; X: noticeable.

c) Fatigue

While sitting on for 4 hours, the fatigue at the back was sensorily evaluated as follows: ○: scarcely fatigued; Δ: somewhat fatigued; X: extremely fatigued.

Example 1

TPE-1 and 3 parts by weight, per 100 parts by weight of the TPE-1, of an azodicarboxylic acid amide-based foaming agent (decomposition temperature: 198° C.) were dry-blended and molded. The cylinder temperatures in the injection molding machine were set to 190° C., 220° C. and 230° C. from the hopper side to the nozzle side. The injection dose was regulated to 48 g in terms of the thermoplastic elastomer. Table 1 shows the injection angles of the orifices of the mold employed and the phase differences among the orifices adjacent to each other. After the completion of injection, cooling and demolding were carried out to give a cushioning article of the desired steric shape. This cushioning article was evaluated as described above. Table 1 shows the results.

Examples 2 to 5

Cushioning articles were produced as in Example 1 but using TPE-2, TPE-3, TPE-4 and TPE-5. Table 1 shows the evaluation data of the cushioning articles thus obtained.

TABLE 1

|  | Example 1 | Example 2 | Example 3 | Example 4 | Example 5 |
|---|---|---|---|---|---|
| Discharge angle of spinneret | 20 | 20 | 20 | 20 | 20 |
| Phase difference among adjacent strands |  |  |  |  |  |
| Lengthwise | 90 | 90 | 90 | 90 | 90 |
| Crosswise | 90 | 90 | 90 | 90 | 90 |
| TPE component | TPE-1 | TPE-2 | TPE-3 | TPE-4 | TPE-5 |
| Foaming agent | azodi-carboxylic acid amide | azodi-carboxylic acid amide | azodi-carboxylic acid amide | azodi-carboxylic acid amide | azodi-carboxylic acid amide |
| Content (wt. part) | 3 | 3 | 3 | 3 | 3 |
| Expansion ratio of fiber | 1.6 | 1.9 | 1.9 | 1.7 | 1.8 |
| Fusion conditions | good | good | good | good | good |
| Apparent density of cushioning article (g/cm³) | 0.066 | 0.068 | 0.068 | 0.053 | 0.055 |
| Settling resistance (%) | 8 | 8 | 8 | 15 | 16 |
| Comfortableness in sitting on |  |  |  |  |  |
| a) Touch to floor | ○ | ○ | ○ | ○ | ○ |
| b) Stuffiness | ○ | ○ | ○ | ○ | ○ |
| c) Fatigue | ○ | ○ | ○ | ○ | ○ |

Comprative Examples 1 to 3

Cushioning articles were produced by using TPE-1 as in Example 1 but altering the injection angles of the orifices and the phase differences among adjacent orifices as shown in Table 2. Table 2 shows the results.

TABLE 2

|  | Comparative Example 1 | Comparative Example 2 | Comparative Example 3 |
|---|---|---|---|
| Discharge angle of spinneret | 0 | 50 | 50 |
| Phase difference among adjacent strands |  |  |  |
| Lengthwise | 0 | 0 | 90 |
| Crosswise | 0 | 0 | 90 |

TABLE 2-continued

|  | Comparative Example 1 | Comparative Example 2 | Comparative Example 3 |
|---|---|---|---|
| TPE component | TPE-1 | TPE-1 | TPE-1 |
| Foaming agent | azodicarboxylic acid amide | azodicarboxylic acid amide | azodicarboxylic acid amide |
| Content (wt. part) | 3 | 3 | 3 |
| Expansion ratio of fiber | 1.7 | 1.6 | 1.7 |
| Fusion conditions | poor | good | good |
| Apparent density of cushioning article (g/cm$^3$) | 0.108 | 0.133 | 0.113 |
| Settling resistance (%) | 29 | 28 | 26 |
| Comfortableness in sitting on | | | |
| a) Touch to floor | X | x | Δ |
| b) Stuffiness | Δ | x | Δ |
| C) Fatigue | X | x | X |

Examples 6 to 10

Cushioning articles were produced by using TPE-1 as in Example 1 but under the conditions as specified in Table 3. Table 3 shows the evaluation data of the cushioning articles thus obtained.

TABLE 3

|  | Example 6 | Example 7 | Example 8 | Example 9 | Example 10 |
|---|---|---|---|---|---|
| Discharge angle of spinneret | 10 | 35 | 20 | 20 | 20 |
| Phase difference among adjacent strands | | | | | |
| Lengthwise | 90 | 90 | 0 | 30 | 120 |
| Crosswide | 90 | 90 | 0 | 30 | 120 |
| TPE component | TPE-1 | TPE-1 | TPE-1 | TPE-1 | TPE-1 |
| Foaming agent | azodicarboxylic acid amide | azodicarboxylic acid amide | azodicarboxylic acid amide | azodicarboxylic acid amide | azodicarboxylic acid amide |
| Content (wt. part) | 3 | 3 | 3 | 3 | 3 |
| Expansion ratio of fiber | 1.7 | 1.7 | 1.7 | 1.8 | 1.8 |
| Fusion conditions | good | good | good | good | good |
| Apparent density of cushioning article (g/cm$^3$) | 0.08 | 0.08 | 0.09 | 0.07 | 0.07 |
| Settling resistance (%) | 7 | 2 | 8 | 8 | 5 |
| Comfortableness in sitting on | 15 | 14 | 20 | 15 | 12 |
| a) Touch to floor | 0 | 0 | Δ | 0 | 0 |
| b) Stuffiness | 0 | 0 | 0 | 0 | 0 |
| c) Fatigue | 0 | 0 | Δ | 0 | 0 |

Examples 11 to 15

Cushioning articles were produced as in Example 1 but using TPE-1, TPE-2, TPE-3, TPE-4 and TPE-5 without adding any foaming agent. Table 4 shows the evaluation data of the cushioning articles thus obtained.

TABLE 4

|  | Example 11 | Example 12 | Example 13 | Example 14 | Example 15 |
|---|---|---|---|---|---|
| Discharge angle of spinneret | 20 | 20 | 20 | 20 | 20 |
| Phase difference among adjacent strands | | | | | |
| Lengthwise | 90 | 90 | 90 | 90 | 90 |
| Crosswise | 90 | 90 | 90 | 90 | 90 |
| TPE component | TPE-1 | TPE-2 | TPE-3 | TPE-4 | TPE-5 |
| Fusion conditions | good | good | good | good | good |
| Apparent density of cushioning article (g/cm$^3$) | 0.11 | 0.11 | 0.11 | 0.90 | 0.95 |
| Settling resistance (%) | 21 | 22 | 20 | 23 | 23 |
| Comfortableness in sitting on | 0 | 4 | 8 | 5 | 3 |
| a) Touch to floor | Δ | Δ | Δ | Δ | Δ |
| b) Stuffiness | 0 | 0 | 0 | 0 | 0 |
| c) Fatigue | 0 | 0 | 0 | Δ | Δ |

According to the process of the invention, a process for producing a highly air-permeable cushioning article can be provided. Because of being made with the use of sufficiently air-permeable strand aggregates, the cushioning articles produced according to the invention give little stuffiness and are highly comfortable in sitting on. Therefore, these cushioning articles are appropriately usable in pads for various vehicle seats and cushioning materials for sofas and beds.

What is claimed is:

1. A process for producing a cushioning article, which comprises:

providing an injection molding apparatus having plural injection orifices, said orifices each having a discharge angle from 5° to 45° inclining from the vertical direction;

injecting a thermoplastic polymer material in the form of strand from said plural orifices into a mold; and cooling said mold followed by demolding.

2. The production process according to claim 1, wherein the discharge angles of said orifices as projected into a horizontal plane each has a phase difference of from 5° to 120° relative to those of adjacent orifices.

3. The production process according to claim 1, wherein said thermoplastic polymer material contains a foaming agent.

4. The production process according to claim 1, wherein said thermoplastic polymer material comprises a thermoplastic elastomer.

5. The production process according to claim 4, wherein said thermoplastic elastomer is a polyester-based elastomer or a polyurethane-based elastomer.

6. The production process according to claim 2, wherein the horizontal plane is perpendicular to the vertical direction.

7. The production process according to claim 1, wherein the thermoplastic polymer material is at least one selected from the group consisting of polyethylene, polypropylene, polybutene, ethylene-vinyl acetate copolymer, poly (4-methylpentene-1), cycloolefin resin, styrene resin, polyamide resin, polyester resin, modified polyphenylene ether resin, polyacetal resin, polycarbonate resin, and polysulfone resin.

8. The production process according to claim 1, wherein the thermoplastic polymer material has a melt flow rate of 0.5 to 100 g/10 mm.

9. The production process according to claim 1, wherein the thermoplastic polymer material is a thermoplastic elastomer having a Shore D hardness of 20 to 70.

10. The production process according to claim 1, wherein the thermoplastic polymer material further comprises a plasticizer.

11. The production process according to claim 1, wherein the thermoplastic polymer material further comprises at least an additive selected from the group consisting of kaolin, silica, mica, titanium dioxide, alumina, calcium carbonate, calcium silicate, clay, kaolin, diatomaceous earth, asbestos, barium sulfate, aluminum sulfate, calcium sulfate, basic magnesium carbonate, molybdenum disulfide, graphite, glass fiber and carbon fiber.

12. The production process according to claim 1, wherein the thermoplastic polymer material further comprises a flame retardant which is at least one selected from the group consisting of antimony trioxide, antimony pentaoxide, sodium antimonate, magnesium hydroxide, zinc borate, guanidine phosphate, tris (chloroethyl) phosphate, tris (monochloropropyl) phosphate, tris (dichloropropyl) phosphate, tris (tribromophenyl) phosphate, red phosphorus, paraffin chloride, polyethylene chloride, hexabromobenzene and decabromodiphenyl oxide.

13. The production process according to claim 1, wherein the thermoplastic polymer material further comprises a lubricant and/or mold releasing agent.

14. The production process according to claim 1, wherein the thermoplastic polymer material further comprises at least one flame-proofing agents selected from the group consisting of octabromodiphenyl and tetrabromobisphenol polycarbonate; and at least one thickener selected from the group consisting of epoxy compound and isocyanate compound.

15. The production process according to claim 1, wherein the thermoplastic polymer material further comprises silicone oil and/or silicone resins.

16. The production process according to claim 1, wherein the thermoplastic polymer material further comprises a foaming agent which is at least one selected from the group consisting of azo compound, nitroso compound, carbonate, organic acid, sodium boron hydride, p,p'-oxybisbenzenesulfonyl semicarbazide, p-toluenesulfonyl semicarbazide, and trihydrazinotriazine.

17. The production process according to claim 16, wherein the foaming agent is added in a step of kneading the materials or in the step of molding.

18. The production process according to claim 2, wherein the phase difference is constant between orifices.

* * * * *